July 28, 1959     E. H. SHIPP     2,897,073
GASIFIER FOR LIQUID FUELS
Filed Sept. 28, 1956     2 Sheets-Sheet 2
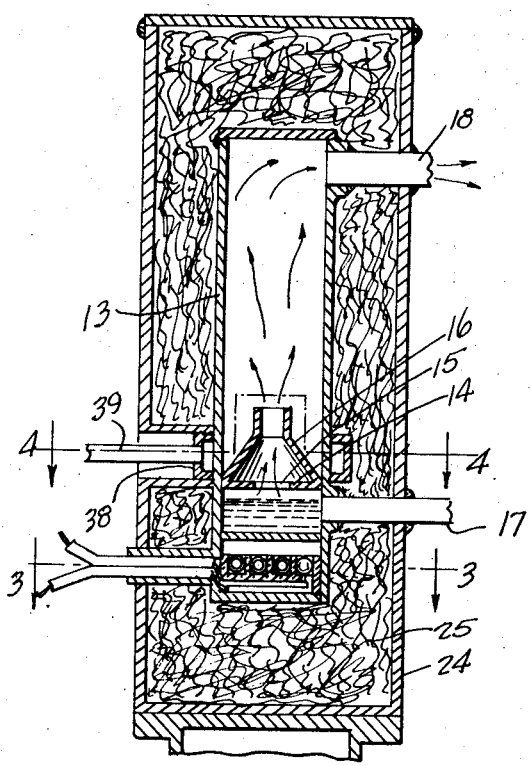
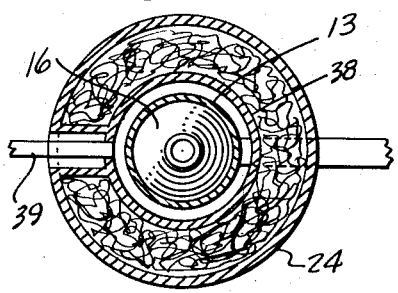
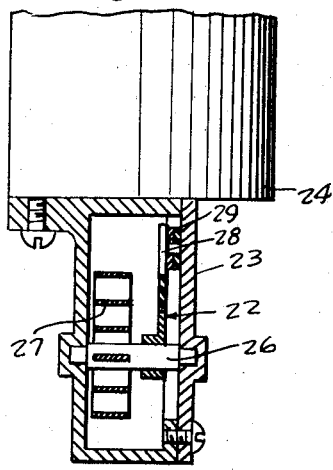
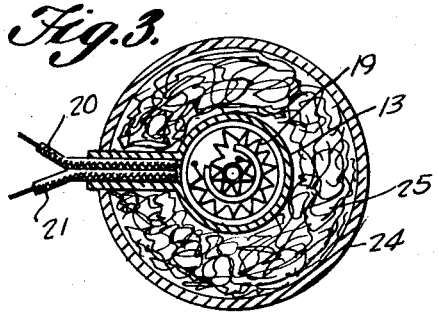
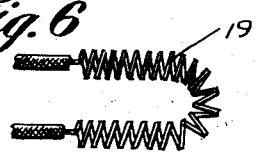
INVENTOR.
Easton H. Shipp,
McMorrow, Berman + Davidson
ATTORNEYS

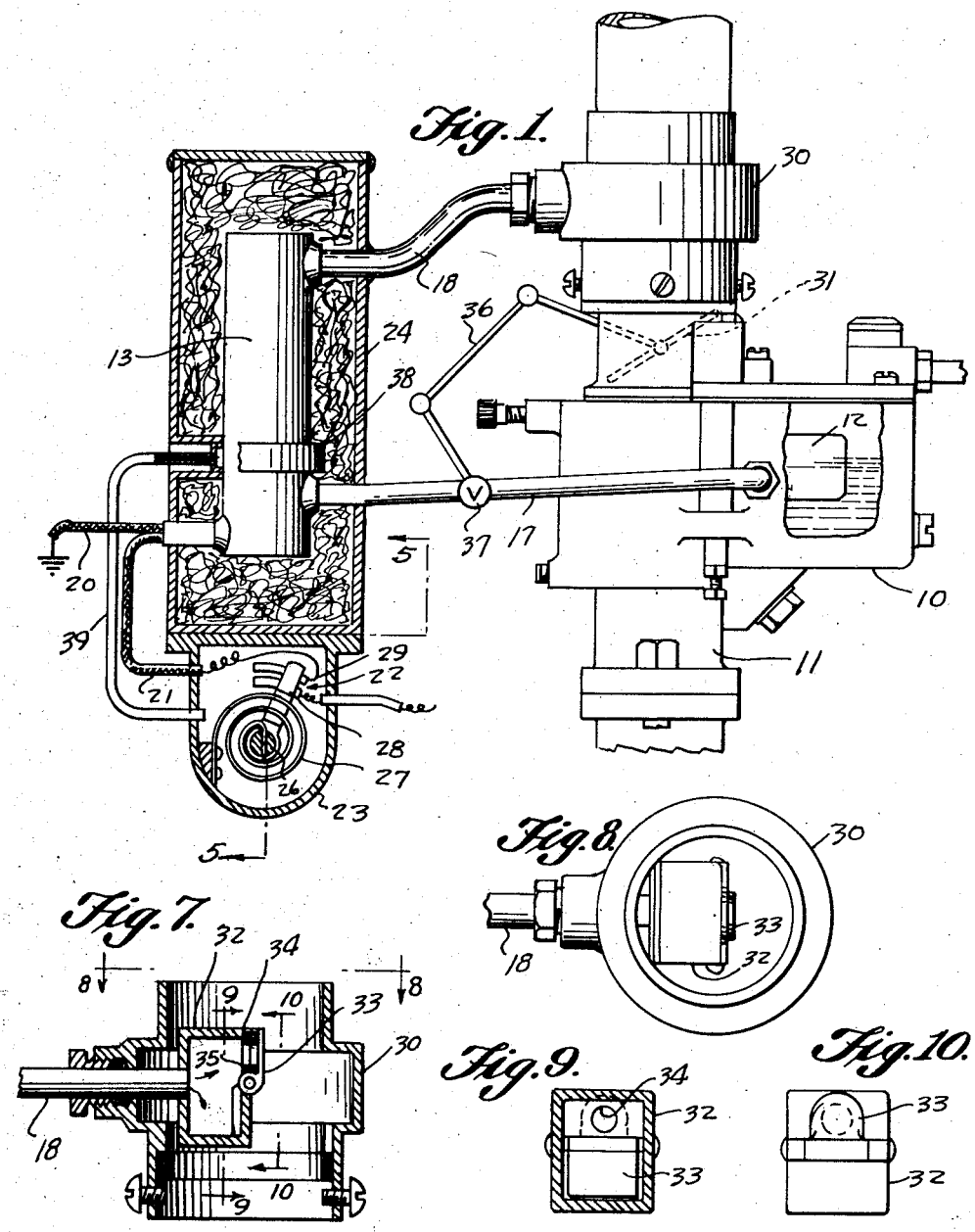

United States Patent Office 2,897,073
Patented July 28, 1959

2,897,073

GASIFIER FOR LIQUID FUELS

Easton H. Shipp, Sullivan, Ind.

Application September 28, 1956, Serial No. 612,713

3 Claims. (Cl. 48—103)

The present invention relates to internal combustion engines generally and in particular to a gasifier for supplying combustible fuel vapor-air mixture to the engine manifold.

An object of the present invention is to provide a device for forming a combustible fuel vapor-air mixture in a manifold of an internal combustion engine, and one which lends itself readily to the ready volatization of gasoline, kerosene, and other petroleum products, one which is foolproof in operation, one which lends itself to easy and ready starting in cold weather, and one which is highly effective in action.

These and other objects and advantages of the present invention will be fully apparent from the following description when taken in connection with the annexed drawings, in which:

Figure 1 is an elevational view of a conventional down draft manifold of an internal combustion engine, and a carburetor float chamber attached thereto, with a gasifier of the present invention shown partially in section;

Figure 2 is a sectional view, on an enlarged scale, of the gasifier shown in Figure 1;

Figure 3 is a sectional view taken on the line 3—3 of Figure 2;

Figure 4 is a sectional view taken on the line 4—4 of Figure 2;

Figure 5 is a sectional view taken on the line 5—5 of Figure 1;

Figure 6 is a detail view of the unformed heating element shown in Figures 2 and 3;

Figure 7 is a sectional view of the mixing chamber detached from the manifold;

Figure 8 is a view taken on the line 8—8 of Figure 7;

Figure 9 is a sectional view taken on the line 9—9 of Figure 7; and

Figure 10 is a view taken on line 10—10 of Figure 7.

Referring in greater detail to the drawings, in which like numerals indicate like parts throughout the several views, the present invention consists in a device for forming a combustible fuel vapor-air mixture in the intake manifold of an internal combustion engine and comprises a housing 10, constituting a chamber, positioned contiguous to and supported on the down draft throat of the intake manifold, the latter being designated by the reference numeral 11. The chamber holds a body of liquid fuel received from a supply tank, and a float 12 in the chamber maintains the fuel at the desired level. An upstanding closed casing 13 is positioned adjacent the housing 10 and is supported by conventional means on the engine, neither the engine nor the supply tank being shown as not a part of the invention.

A horizontally disposed plate 14 extends across the interior of the casing 13 adjacent to and spaced from the lower end of the casing 13 and subdivides the casing 13 into a liquid receiving chamber, and a vaporizing chamber. The plate 14 has an aperture 15 centrally thereof.

A baffle member 16 is positioned above the plate 14 and forms with the plate 14 a baffle chamber. The baffle member embodies an inverted funnel having its large end resting upon the plate 14 and having an outlet discharging from the smaller end of the funnel into the vaporizing chamber. A conduit 17 connects the chamber within the housing 10 with the liquid receiving chamber beneath the plate 14 in the lower end of the casing 13 and another conduit 18 connects the vaporizing chamber and the upper end of the casing 13 to the manifold 11.

Heating means is operatively connected to the liquid receiving chamber in the lower end of the casing 13 and comprises a spirally wound resistance wire, seen in Figure 6 in undeveloped form and indicated by the reference numeral 19, connected by wires 20 and 21 to the vehicle frame or other ground, and to one side of a thermostatically controlled switch 22 supported in a confined enclosure 23 externally of and secured to the lower end of the casing 13. The other side of the switch 22 is connected to the ignition wire of the vehicle.

The casing 13 is positioned centrally of an outer cylinder 24 and the space between the casing 13 and the cylinder 24 is filled with an insulating substance such as rock wool, fiber glass, or the like, and indicated by the reference numeral 25. The thermally responsive switch 22 includes a shaft 26 journaled by its ends in the confined enclosure 23 and supporting an expandable flat coil 27 fabricated of a bimetallic element which is responsive to heat to rotate the shaft 26 and to move the contact arm 28 from one end to the other end of the resistance elements of the switch 22, the latter being designated by the reference numeral 29.

Means is provided for admitting the vaporized fuel to the manifold 11 responsive to the partial vacuum created in the manifold 11 by the cylinders and pistons of the engine. Specifically, this means comprises a sleeve 30 mounted upon the manifold 11 externally of the throttle 31 which is shown in dotted lines in Figure 1. Supported within the sleeve 30 is an outlet member 32 mounted upon the ehd of the conduit 18 and having an openable and closable valve 33 normally closing an opening 34 in the outlet member 32. The valve 33 is openable in response to vacuum within the manifold 11 and delivers gasified fuel thereto. Cooperating gaskets 35 on the valve 33 and around the opening 34 prevent the escape of the fuel in gaseous form except when the throttle 31 is opened. Conventional linkage 36, shown schematically in Figure 1, connects the throttle 31 to a valve 37 in the conduit 17 to control the flow of fuel into the liquid chamber portion of the casing 13 below the plate 14 in conjunction with the opening of the throttle 31.

A ring chamber 38 surrounds the casing 13 and is connected by an open conduit 39 with the interior of the casing 23 for conducting the heat within the casing 13 to the confined enclosure 23 for effecting the operation of the switch 22.

In operation, the thermally responsive switch 22 maintains the temperature of the liquid entering the liquid chamber of the casing 13 at the vaporizing temperature of the liquid fuel being used. The vaporized fuel is accumulated within the upper end of the casing 13 and is fed into the manifold 11 responsive to the vacuum created therein and in the quantity necessary to maintain combustion in the engine, dependent upon the load on the engine.

What is claimed is:

1. The combination with an intake manifold of a device for forming a combustible fuel vapor-air mixture in said manifold, said device comprising a float chamber adapted to contain a body of combustible fuel in liquid form positioned contiguous to said manifold, an upstanding closed casing positioned adjacent said chamber, a horizontally disposed plate extending across the interior of said casing adjacent to and spaced from the lower end of said casing and subdividing the casing into a liquid receiving chamber and a vaporizing chamber, there being an aperture in said plate, a baffle member positioned above said plate and forming with said plate a baffle chamber, the upper end of said baffle chamber having an outlet discharging into said vaporizing chamber, a first conduit connecting said float chamber with said liquid receiving chamber, a second conduit connecting said vaporizing chamber to said manifold, electric heating means operatively connected to said liquid receiving chamber, a confined enclosure exteriorly of said casing, a thermally responsive switch in said enclosure and operatively connected to said heating means for controlling the operation of said heating means, a ring chamber surrounding a part of said casing contiguous to said vaporizing chamber, and means conducting heat from said ring chamber to said confined enclosure for effecting operation of said switch.

2. The combination with an intake manifold of a device for forming a combustible fuel vapor-air mixture in said manifold, said device comprising a float chamber adapted to contain a body of combustible fuel in liquid form positioned contiguous to said manifold, an upstanding closed casing positioned adjacent said chamber, a horizontally disposed plate extending across the interior of said casing adjacent to and spaced from the lower end of said casing and subdividing the casing into a liquid receiving chamber and a vaporizing chamber, there being an aperture in said plate, a baffle member embodying an inverted funnel-shaped member positioned above said plate with its large end resting upon said plate and forming with said plate a baffle chamber, the smaller end of said funnel shaped member having an outlet discharging into said vaporizing chamber, a first conduit connecting said float chamber with said liquid receiving chamber, a second conduit connecting said vaporizing chamber to said manifold, electric heating means operatively connected to said liquid receiving chamber, a confined enclosure exteriorly of said casing, a thermally responsive switch in said enclosure and operatively connected to said heating means for controlling the operation of said heating means, a ring chamber surrounding a part of said casing contiguous to said vaporizing chamber, and means conducting heat from said ring chamber to said enclosure for effecting operation of said switch.

3. The combination with an intake manifold of a device for forming a combustible fuel vapor-air mixture in said manifold, said device comprising a float chamber adapted to contain a body of combustible fuel in liquid form positioned contiguous to said manifold, an upstanding closed casing positioned adjacent said chamber, a horizontally disposed plate extending across the interior of said casing adjacent to and spaced from the lower end of said casing and subdividing the casing into a liquid receiving chamber and a vaporizing chamber, there being an aperture in said plate, a baffle member positioned above said plate and forming with said plate a baffle chamber, the upper end of said baffle chamber having an outlet discharging into said vaporizing chamber, a first conduit connecting said float chamber with said liquid receiving chamber, a second conduit connecting said vaporizing chamber to said manifold, electric heating means operatively connected to said liquid receiving chamber, a confined enclosure exteriorly of said casing, a thermally responsive switch in said enclosure and operatively connected to said heating means for controlling the operation of said heating means, a ring chamber surrounding a part of said casing contiguous to said vaporizing chamber, means conducting heat from said ring chamber to said enclosure for effecting operation of said switch, and a normally closed valve in said second conduit operable to open in response to suction in said manifold.

References Cited in the file of this patent
UNITED STATES PATENTS

| | | |
|---|---|---|
| 464,779 | Reichhelm et al. | Dec. 8, 1891 |
| 1,120,857 | Southey | Dec. 15, 1914 |
| 2,123,884 | Faverty | July 19, 1938 |
| 2,265,684 | Campbell | Dec. 9, 1941 |
| 2,285,905 | Cunningham et al. | June 9, 1942 |
| 2,300,244 | Achterman | Oct. 27, 1942 |
| 2,724,157 | Parks | Nov. 22, 1955 |
| 2,759,067 | Campinizzi | Aug. 14, 1956 |